United States Patent
Ootaka

(10) Patent No.: US 8,487,632 B2
(45) Date of Patent: Jul. 16, 2013

(54) ELECTROSTATIC SENSOR AND OCCUPANT DETECTING DEVICE HAVING THE SAME

(75) Inventor: Kouji Ootaka, Toyohashi (JP)

(73) Assignee: Denso Corporation, Kariya (JP)

( * ) Notice: Subject to any disclaimer, the term of this patent is extended or adjusted under 35 U.S.C. 154(b) by 465 days.

(21) Appl. No.: 12/802,835

(22) Filed: Jun. 15, 2010

(65) Prior Publication Data

US 2010/0315090 A1      Dec. 16, 2010

(30) Foreign Application Priority Data

Jun. 16, 2009 (JP) ................................. 2009-143361

(51) Int. Cl.
*G01N 27/60* (2006.01)

(52) U.S. Cl.
USPC ........... 324/452; 324/649; 324/691; 340/561; 702/47

(58) Field of Classification Search
None
See application file for complete search history.

(56) References Cited

U.S. PATENT DOCUMENTS

| | | | |
|---|---|---|---|
| 7,637,532 B2 * | 12/2009 | Yamanaka et al. ............ | 280/735 |
| 2005/0275202 A1 | 12/2005 | Wato et al. | |
| 2006/0005630 A1 | 1/2006 | Jitsui et al. | |
| 2006/0164254 A1 * | 7/2006 | Kamizono et al. ............ | 340/667 |
| 2008/0054609 A1 | 3/2008 | Yamanaka et al. | |

FOREIGN PATENT DOCUMENTS

| | | |
|---|---|---|
| JP | 11-271463 | 10/1999 |
| JP | 2000-311563 | 11/2000 |
| JP | 2003-520344 | 7/2003 |
| JP | 2006-10490 | 1/2006 |
| JP | 2006-27591 | 2/2006 |
| JP | 2006-201129 | 8/2006 |
| JP | 2008-64501 | 3/2008 |
| WO | WO 00/38958 | 7/2000 |

OTHER PUBLICATIONS

Office action dated Apr. 12, 2011 in corresponding Japanese Application No. 2009-143361.

* cited by examiner

*Primary Examiner* — Minh N Tang
(74) *Attorney, Agent, or Firm* — Harness, Dickey & Pierce, PLC

(57) ABSTRACT

An electrostatic sensor for a vehicle includes a loop-shaped electrode arranged in a seat bottom of the vehicle, and a sensor portion to detect a weak electric field generated between the electrode and a chassis of the vehicle when a predetermined voltage is applied to the electrode. The electrode has an imaginary center line linearly extending in a front-and-rear direction of the vehicle. The electrode defines a resistance distribution approximately symmetrical in a left-and-right direction of the vehicle relative to the imaginary center line.

7 Claims, 4 Drawing Sheets

ELECTROSTATIC SENSOR AND OCCUPANT DETECTING DEVICE HAVING THE SAME

CROSS REFERENCE TO RELATED APPLICATION

This application is based on Japanese Patent Application No. 2009-143361 filed on Jun. 16, 2009, the disclosure of which is incorporated herein by reference in its entirety.

BACKGROUND OF THE INVENTION

1. Field of the Invention

The present invention relates to an electrostatic sensor and an occupant detecting device having the electrostatic sensor.

2. Description of Related Art

JP-A-H11-271463 discloses an occupant detecting device having a mat-shaped electrostatic sensor and a detection electronic control unit (ECU). The sensor has a main electrode arranged in a vehicle seat, and a weak electric field is generated between the main electrode and a vehicle chassis. A disturbance of the electric field is detected, and the detected disturbance is output as a current or voltage.

For example, when the vehicle seat is vacant, air is located between the main electrode and the vehicle chassis. When a child restraint system (CRS) is mounted on the vehicle seat, the CRS is located between the main electrode and the vehicle chassis. When a human adult is seated on the vehicle seat, a body of the adult is located between the main electrode and the vehicle chassis.

Air has a specific dielectric constant of about 1. The CRS has a specific dielectric constant of about 2-5. The body of the adult has a specific dielectric constant of about 50. That is, the specific dielectric constant is different among the air, CRS, and human body. Therefore, a capacitance between the main electrode and the vehicle chassis is varied when a kind of object located between the main electrode and the vehicle chassis is changed.

The disturbance of the electric field is generated by a difference of the capacitance, and is output as a current or voltage. The detection ECU performs an occupant determination based on the output current or voltage. Specifically, the detection ECU determines the vehicle seat to be vacant or to have the CRS or adult. An airbag ECU allows or prohibits an inflation of airbag based on the determination of the detection ECU. When the vehicle seat is vacant, or when a CRS is mounted on the vehicle seat, the inflation of airbag is prohibited. When an adult is seated on the vehicle seat, the inflation of airbag is allowed.

JP-A-2006-27591 discloses an electrostatic sensor to detect liquid such as water contained in a vehicle seat. When the vehicle seat contains water, an occupant determination becomes difficult, because water has a specific dielectric constant of about 80, which is larger than that of a human body. Therefore, the electrostatic sensor has a sub electrode to detect water, other than a main electrode. A disturbance of an electric field between the sub electrode and the main electrode is output as a current or voltage. Thus, water contained in the vehicle seat can be detected, such that a vehicle seat having an occupant can be more clearly distinguished from the wet vacant seat.

JP-A-2006-201129 discloses an electrostatic sensor having a pair of electrodes. A current flowing between the pair of electrodes is reduced when a vehicle seat is vacant. Due to the current reduction, an occupant seated on the vehicle seat can be accurately detected. Specifically, the electrostatic sensor has a capacitance-reducing guard electrode, other than a main electrode. If a sine wave corresponding to a high frequency low voltage is applied between the guard electrode and a vehicle ground (GND) from a detection ECU, capacitors are defined among the main electrode, human body and vehicle GND. The detection ECU detects a current corresponding to a capacitance of the capacitor.

JP-A-2003-520344 discloses an occupant sensor, and an electrode area of the sensor is made larger. In this case, an occupant seated on a vehicle seat can be more easily and accurately detected.

The occupant sensor has a flat shape, and is arranged inside of the vehicle seat at an approximately center position. However, the occupant sensor may have resistance distribution asymmetrical in a left-and-right direction of the vehicle seat relative to an imaginary center line linearly extending in a front-and-rear direction of the vehicle seat. Therefore, detection error may be generated by a seating position deviation of the occupant, and accuracy for determining the occupant may be lowered.

SUMMARY OF THE INVENTION

In view of the foregoing and other problems, it is an object of the present invention to provide an electrostatic sensor and an occupant detecting device having the electrostatic sensor.

According to a first example of the present invention, an electrostatic sensor for a vehicle includes a loop-shaped electrode arranged in a seat bottom of the vehicle, and a sensor portion to detect a weak electric field generated between the electrode and a chassis of the vehicle when a predetermined voltage is applied to the electrode. The electrode has an imaginary center line linearly extending in a front-and-rear direction of the vehicle. The electrode defines a resistance distribution approximately symmetrical in a left-and-right direction of the vehicle relative to the imaginary center line.

Accordingly, detection accuracy of the electrostatic sensor can be raised.

According to a second example of the present invention, an occupant detecting device has an electronic control unit to apply an alternating voltage signal to the electrostatic sensor as the predetermined voltage. The electrostatic sensor outputs a current when the alternating voltage signal is applied. The electronic control unit converts the current into a voltage value. The electronic control unit determines an object located on the seat bottom based on the voltage value.

Accordingly, detection accuracy of the occupant detecting device can be raised.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENT

Figure 3A:
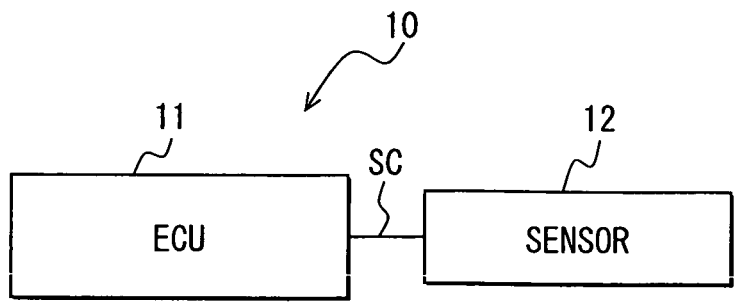
FIG. 3A is a block diagram illustrating an occupant detecting device having an electrostatic sensor of the embodiment.
Figure 3B:
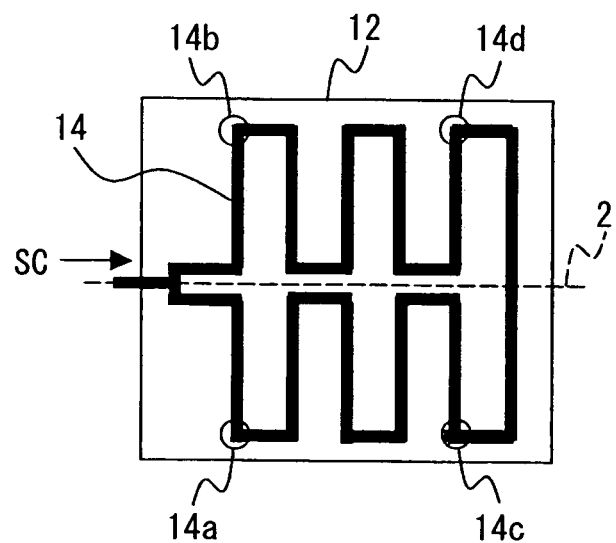
FIG. 3B is a schematic plan view illustrating an electrode pattern of the electrostatic sensor.

As shown in FIG. 3A, an occupant detecting device 10 has an occupant detection ECU 11 and an electrostatic sensor 12 connected to the ECU 11. The sensor 12 is arranged inside of a seat bottom of a vehicle seat (not shown). As shown in FIG. 3B, the sensor 12 has a loop-shaped electrode pattern 14 approximately symmetrical relative to an imaginary center line 2 linearly extending in a front-and-rear direction of the vehicle seat. The line 2 is indicated by a dashed line of FIG. 3B.

A sine wave SC is generated by the ECU 11, and is applied to the sensor 12. When a disturbance is generated in a weak electric field defined between the electrode pattern 14 and a vehicle chassis (not shown) conducting with the ground, the disturbance is detected by a sensor portion of the sensor 12. The detected disturbance is output from the sensor 12 to the ECU 11 as a current. The ECU 11 converts the current into a voltage value, and determines an object such as a human located on the vehicle seat based on the voltage value.

An input terminal of the sine wave SC is a start of the loop shape of the electrode pattern 14. The electrode pattern 14 has a left area and a right area relative to the center line 2, and a rectangular wave shape is defined in each of the areas at a predetermined interval. The wave shape of the left area and the wave shape of the right area are connected with each other.

The vehicle seat is determined to be vacant or to have an object. Further, when the object is detected, the object is determined to be a child restraint system (CRS), a child or an adult. An absorber (not shown) is set to be inflated or not based on the object determination result, and the object determination result is sent to an absorber ECU (not shown). The absorber ECU controls the absorber based on the object determination result and a collision determination result.

Figure 3C:
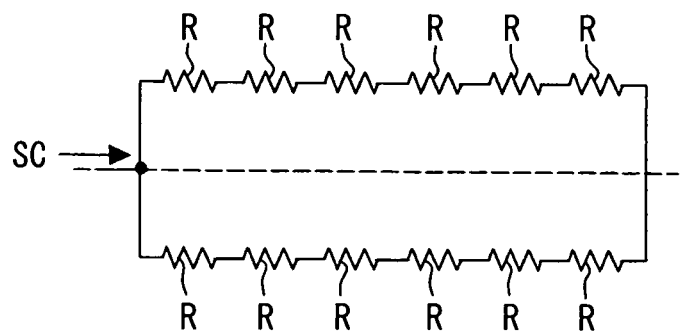
FIG. 3C is an equivalent circuit of the electrode pattern of FIG. 3B.

Resistance distribution of the electrode pattern 14 of the sensor 12 is made approximately equivalent between the left area and the right area relative to the center line 2 extending in the front-and-rear direction. If the electrode pattern 14 is divided into 12 parts, an equivalent circuit of FIG. 3C represents each resistance R of the 12 parts.

As shown in FIG. 3B, the electrode pattern 14 has a first position 14a, a second position 14b, a third position 14c and a fourth position 14d. The first position 14a is a corner located most adjacent to the input terminal, and is located in the right area. The second position 14b is located in the left area, and is symmetrical to the first position 14a relative to the center line 2. The third position 14c is a corner located the second farthest from the input terminal when the electrode pattern 14 extends from the first position 14a in an arrow direction of the sine wave SC, and is located in the right area. The fourth position 14d is located in the left area, and is symmetrical to the third position 14c relative to the center line 2.

Figure 4A:
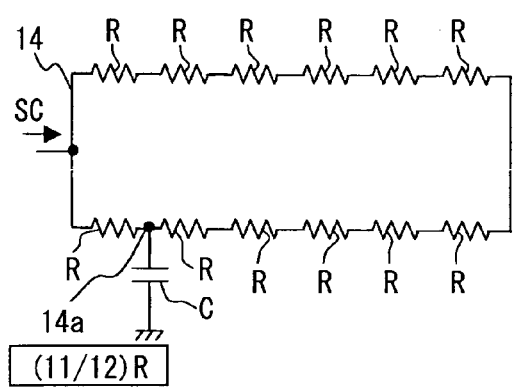
FIG. 4A is an equivalent circuit illustrating a resistance of a first position of the electrode pattern.
Figure 4B:
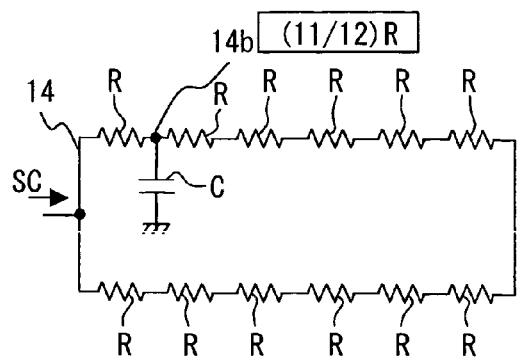
FIG. 4B is an equivalent circuit illustrating a resistance of a second position of the electrode pattern.
Figure 4C:
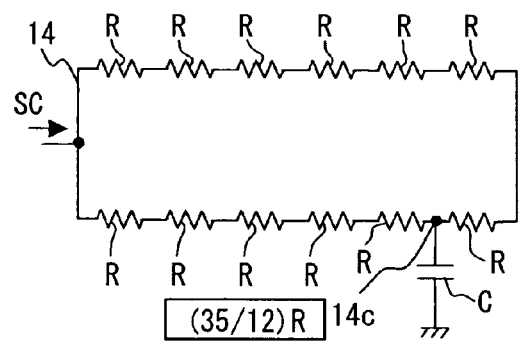
FIG. 4C is an equivalent circuit illustrating a resistance of a third position of the electrode pattern.
Figure 4D:
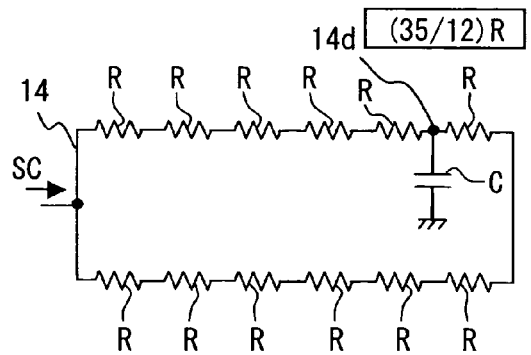
FIG. 4D is an equivalent circuit illustrating a resistance of a fourth position of the electrode pattern.

As shown in FIG. 4A, the first position 14a of the electrode pattern 14 has a resistance of (11/12) R. As shown in FIG. 4B, the second position 14b has a resistance of (11/12) R. As shown in FIG. 4C, the third position 14c has a resistance of (35/12) R. As shown in FIG. 4D, the fourth position 14d has a resistance of (35/12) R. A capacitor C of FIG. 4A, 4B, 4C or 4D represents a capacitance of an occupant to be detected, for example.

The first position 14a and the second position 14b have the same resistance (11/12) R. The third position 14c and the fourth position 14d have the same resistance (35/12) R.

According to the embodiment, the resistance distribution of the electrode pattern 14 is approximately the same between the left area and the right area relative to the center line 2. Therefore, if a human adult is seated at a center position of the vehicle seat, detection sensitivity of the sensor 12 has no difference between the left area and the right area. Further, even if the human adult is seated on a right side position of the vehicle seat, or even if the human adult is seated on a left side position of the vehicle seat, the detection sensitivity of the sensor 12 has little difference between the left area and the right area. Thus, detection error of the electrostatic sensor 12 generated by a seating position deviation can be reduced. Accordingly, determination accuracy of the device 10 can be raised.

Figure 5A:
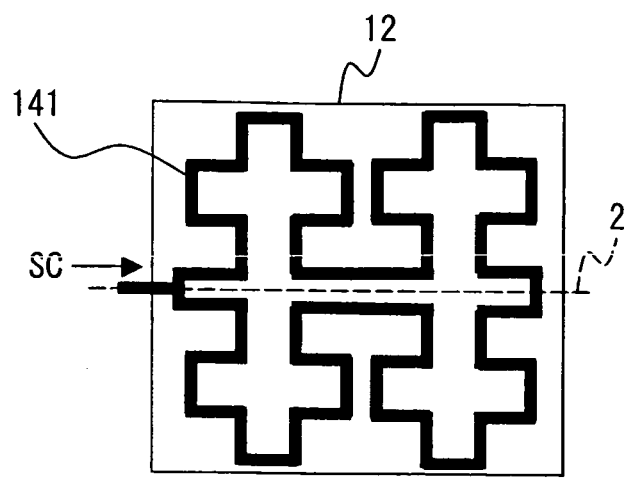
FIG. 5A is a schematic plan view illustrating an electrode pattern of the electrostatic sensor.
Figure 5B:
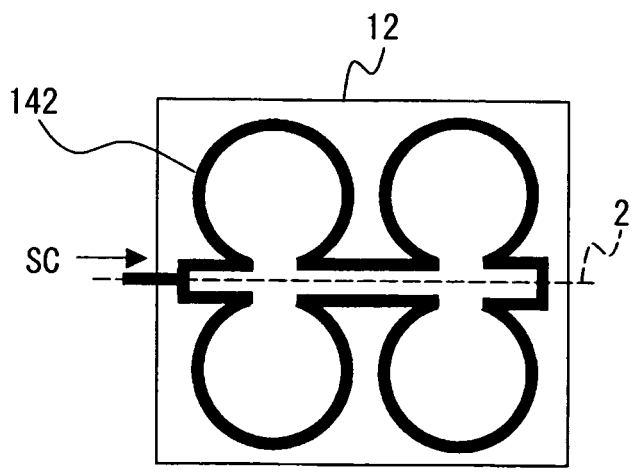
FIG. 5B is a schematic plan view illustrating an electrode pattern of the electrostatic sensor.

Alternatively, the sensor 12 may have an electrode pattern 141 shown in FIG. 5A or an electrode pattern 142 shown in FIG. 5B.

The electrode pattern 141 has plural cross-shapes located at a predetermined interval, and the cross-shapes are connected with each other into a loop. A start of the electrode pattern 141 is defined by an input terminal of the sine wave SC. The shape of the electrode pattern 141 is approximately symmetrical relative to the center line 2.

The electrode pattern 142 has plural circle-shapes located at a predetermined interval, and the circle-shapes are connected with each other into a loop. A start of the electrode pattern 142 is defined by an input terminal of the sine wave SC. The shape of the electrode pattern 142 is approximately symmetrical relative to the center line 2.

Figure 1A:
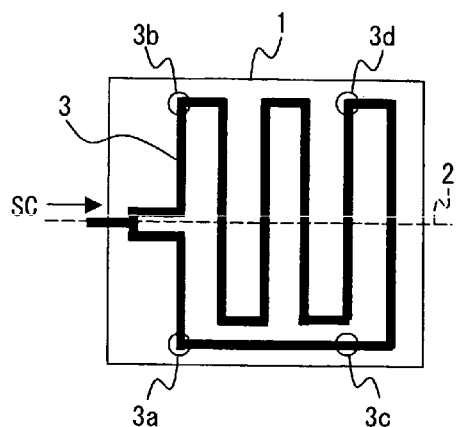
FIG. 1A is a schematic plan view illustrating an electrode pattern of an electrostatic sensor according to an embodiment.

Alternatively, as shown in FIG. 1A, an electrostatic sensor 1 of the occupant detecting device 10 may have an electrode pattern 3, and a shape of the electrode pattern 3 is asymmetrical in the left-and-right direction relative to the imaginary center line 2. The electrode pattern 3 has a loop shape, and a start of the loop shape is defined by an input terminal. A sine wave SC is applied to the input terminal from a detection ECU (not shown). The sine wave SC corresponds to an alternating voltage signal.

The electrode pattern 3 has a first position 3a corresponding to the first position 14a, a second position 3b corresponding to the second position 14b, a third position 3c corresponding to the third position 14c and a fourth position 3d corresponding to the fourth position 14d.

The first position 3a is a corner located most adjacent to the input terminal, and is located in the right area. The second position 3b is located in the left area, and is symmetrical to the first position 3a relative to the center line 2. The fourth position 3d is a corner located the second farthest from the input terminal when the electrode pattern 14 extends from the second position 14b in an arrow direction of the sine wave SC, and is located in the left area. The third position 3c is located in the right area, and is symmetrical to the fourth position 3d relative to the center line 2.

Figure 1B:
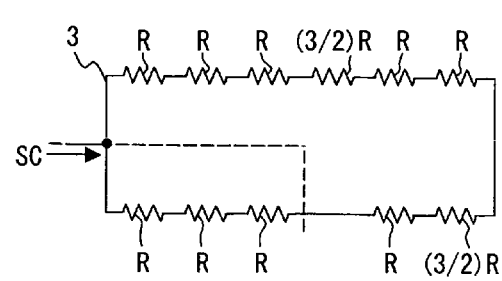
FIG. 1B is an equivalent circuit of the electrode pattern of FIG. 1A.

FIG. 1B is an equivalent circuit representing a resistance R or (3/2) R if the electrode pattern 3 is divided into 11 parts.

Figure 2A:
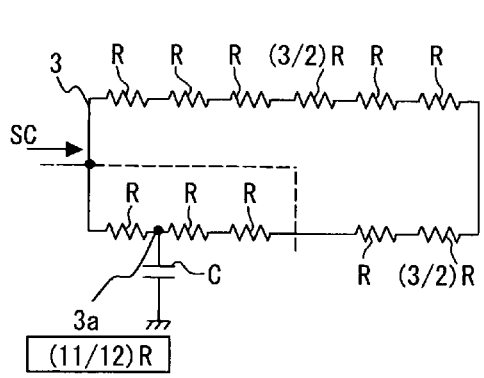
FIG. 2A is an equivalent circuit illustrating a resistance of a first position of the electrode pattern.
Figure 2B:
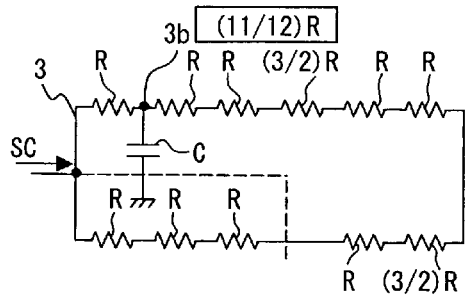
FIG. 2B is an equivalent circuit illustrating a resistance of a second position of the electrode pattern.
Figure 2C:
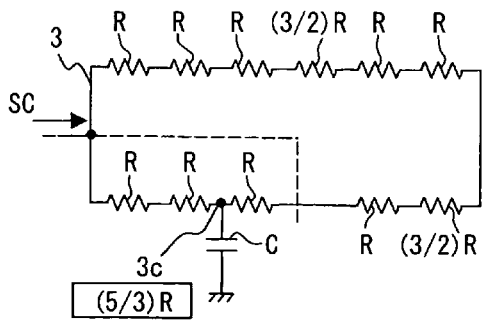
FIG. 2C is an equivalent circuit illustrating a resistance of a third position of the electrode pattern.
Figure 2D:
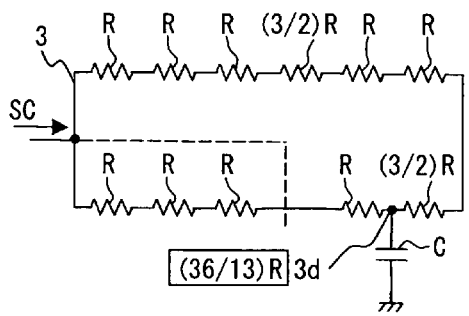
FIG. 2D is an equivalent circuit illustrating a resistance of a fourth position of the electrode pattern.

As shown in FIG. 2A, the first position 3a of the electrode pattern 3 has a resistance of (11/12) R. As shown in FIG. 2B, the second position 3b has a resistance of (11/12) R. As shown in FIG. 2C, the third position 3c has a resistance of (5/3) R. As shown in FIG. 2D, the fourth position 3d has a resistance of (36/13) R. A capacitor C of FIG. 2A, 2B, 2C or 2D represents a capacitance of an occupant to be detected, for example.

The first position 3a and the second position 3b have the same resistance (11/12) R. However, the resistance is different between the third position 3c and the fourth position 3d, while the positions 3c, 3d are symmetrically located relative to the center line 2. Therefore, the electrode pattern 3 has a sensitivity difference of (5/3) R−(36/13) R between the left area and the right area relative to the center line 2. In this case, detection error may be generated by a seating position deviation of the occupant, such that determination accuracy may be lowered.

However, in this case, an adjusting resistance element may be added to an electrode wiring corresponding to the third position 3c having the resistance (5/3) R. Thus, even when the shape of the electrode pattern 3 is asymmetrical relative to the center line 2, the third position 3c can have the same resistance (36/13) R as the four position 3d. That is, due to the adjusting resistance element, the resistance distribution of the electrode pattern 3 can be made symmetrical relative to the center line 2.

Therefore, detection sensitivity deviation can be reduced between the left area and the right area, and detection error generated by a seating position deviation can be reduced. Thus, determination accuracy of the electrostatic sensor 1 can be raised.

The adjusting resistance element may be made of an electrode similar to the electrode pattern 3. Alternatively, the adjusting resistance element may be other electric resistor material. When the adjusting resistance element is made of an electrode similar to the electrode pattern 3, the adjusting resistance element can be easily mounted to the electrode pattern 3.

The sensor 1, 12 may be constructed by a main electrode, a sub electrode and a guard electrode. The main electrode is arranged in the vehicle seat. The sub electrode is distanced from the main electrode, and is located on a front side of the main electrode. The guard electrode is located between the vehicle chassis and the main electrode in a distanced state.

In this case, each of the main electrode, the sub electrode and the guard electrode is defined to have resistance distribution approximately equivalent between the left area and the right area relative to the center line 2. Therefore, a detection sensitivity deviation can be reduced between the left area and the right area, and detection error generated by a seating position deviation can be reduced. Thus, determination accuracy of the electrostatic sensor 1, 12 can be raised.

Further, even when the shape of the electrode pattern 14 is symmetrical between the left area and the right area, a thickness of the electrode pattern 14 may be different between the left area and the right area relative to the imaginary center line 2, when the electrode pattern 14 is produced by printing a conductive material such as silver or carbon. In this case, the resistance distribution of the electrode pattern 14 can be made equivalent between the left area and the right area by arranging the adjusting resistance element. Thus, determination accuracy can be raised.

Such changes and modifications are to be understood as being within the scope of the present invention as defined by the appended claims.

What is claimed is:

1. An electrostatic sensor for a vehicle comprising:
   a loop-shaped electrode arranged in a seat bottom of the vehicle;
   a sensor portion to detect a weak electric field generated between the electrode and a chassis of the vehicle when a predetermined voltage is applied to the electrode, and
   an adjusting resistance element to be connected to the electrode when the electrode has a shape asymmetrical in the left-and-right direction relative to the imaginary center line, wherein
   the electrode has an imaginary center line linearly extending in a front-and-rear direction of the vehicle, and
   the electrode defines a resistance distribution approximately symmetrical in a left-and-right direction of the vehicle relative to the imaginary center line,
   the adjusting resistance element is located on a resistance low side of the electrode in the left-and-right direction relative to the imaginary center line, and
   the resistance low side has a resistance distribution equivalent to a resistance distribution of a resistance high side of the electrode.

2. The electrostatic sensor according to claim 1, wherein the adjusting resistance element is made of an electrode.

3. An occupant detecting device having the electrostatic sensor according to claim 1, the occupant detecting device further comprising:
   an electronic control unit to apply an alternating voltage signal to the electrostatic sensor as the predetermined voltage, wherein
   the electrostatic sensor outputs a current when the alternating voltage signal is applied,
   the electronic control unit converts the current into a voltage value, and the electronic control unit determines an object located on the seat bottom based on the voltage value.

4. The electrostatic sensor according to claim 1, wherein the electrode has a shape asymmetrical in the left-and-right direction relative to the imaginary center line.

5. The electrostatic sensor according to claim 1, wherein the electrode has a thickness asymmetrical in the left-and-right direction relative to the imaginary center line.

6. The electrostatic sensor according to claim 1, wherein the electrode defines one of a plurality of rectangles and a plurality of circles.

7. The electrostatic sensor according to claim 1, wherein the electrode defines a plurality of sections, each section extending in the left-and-right direction and being separate from any other section.

* * * * *